(12) United States Patent
Zeng

(10) Patent No.: US 6,600,617 B1
(45) Date of Patent: Jul. 29, 2003

(54) METHOD AND APPARATUS FOR ADJUSTING DIGITAL FILTER TAPS BASED UPON MINIMIZATION OF VITERBI MARGIN COUNTS

(75) Inventor: Weining Zeng, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/520,702

(22) Filed: Mar. 7, 2000

(51) Int. Cl.[7] ................................................ G11B 5/09
(52) U.S. Cl. .............................. 360/68; 360/46; 360/65
(58) Field of Search ............................... 360/46, 65, 68

(56) References Cited

U.S. PATENT DOCUMENTS

| | | |
|---|---|---|
| 5,258,940 A | 11/1993 | Coker et al. |
| 5,303,263 A | 4/1994 | Shoji et al. |
| 5,504,633 A | 4/1996 | Van Den Enden |
| 5,581,581 A | 12/1996 | Sato |
| 5,585,975 A | 12/1996 | Bliss |
| 5,588,011 A | 12/1996 | Riggle |
| 5,648,987 A | 7/1997 | Yang et al. |
| 5,675,394 A | 10/1997 | Choi |
| 5,734,680 A | 3/1998 | Moore et al. |
| 5,809,080 A | 9/1998 | Karabed et al. |
| 5,872,817 A | 2/1999 | Wei |
| 5,916,315 A | 6/1999 | Ryan |
| 6,003,051 A | * 12/1999 | Okazaki ....................... 360/46 |
| 6,222,879 B1 | * 4/2001 | Cideciyan et al. .......... 375/233 |

* cited by examiner

*Primary Examiner*—David Hudspeth
*Assistant Examiner*—Varsha A. Kapadia

(57) ABSTRACT

A method and apparatus that adjusts FIR taps based upon Viterbi margin counts. The FIR taps are adjusted by a) selecting one of N tap pairs for adjustment, b) adjusting the tap pair up one count and down one count, c) determining whether adjusting the tap pair up or adjusting the tap pair down provides a lower Viterbi margin count from the Viterbi detector and d) selecting the tap adjustment for the pair that provides the lower Viterbi margin count.

16 Claims, 4 Drawing Sheets

METHOD AND APPARATUS FOR ADJUSTING DIGITAL FILTER TAPS BASED UPON MINIMIZATION OF VITERBI MARGIN COUNTS

BACKGROUND OF THE INVENTION

1. Field of the Invention

This invention relates in general to data storage systems, and more particularly to a method and apparatus for adjusting digital filter taps based upon minimization of Viterbi margin counts.

2. Description of Related Art

Areal density specifies how many bits can be stored on a square inch of magnetic media. Areal density is defined as the number of bits/inch (hpi) of a track multiplied by the number of tracks/inch (tpi). To derive more storage capacity from storage systems, manufacturers must continue to push areal bits densities to new heights.

To achieve higher recording densities, new head designs, new media designs and improved read/write channels have played a pivotal role. As traditional technologies reached their performance limits, storage system designers looked to new approaches. One advance includes the use of partial— response, maximum likelihood (PRML) technology in the data channels.

However, noise, e.g., system generated noise or non-linear inter-symbol interference (ISI), degrades channel performance in PRML systems. For example, as higher densities are recorded on media, the magnetic-fluxer transitions between bits become crowded and create inter-symbol interference, i.e. one flux transition interferes with adjacent flux transitions. ISI has the adverse effect of shifting the phase and reducing the amplitude of two neighboring pulse due to superposition or non-linear bit shifts (NLB). Because PRML systems simple amplitude, the resultant phase-shift and reduction in amplitude causes improper sampling.

Equalization minimizes overall bit error rates that may be caused by noise. PRML channels employ finite-impulse-response shape. FIR filters may be optimized through error correction algorithms. Read channels may be designed with FIR filters so that errors from noise may be corrected up until the viterbi detector in a PRML channel.

In read channel equalization, the mean-squared error (MSE) method has been widely used to obtain the appropriate FIR tap weights or filter coefficients. The MSE method works generally well if the system is disturbed by random noise only. Because the objective of MSE equalization is used to minimize the mean-squared error of samples processed by the read channel, any localized defect is going to be "averaged out" in terms of its effect on the FIR taps. However, this kind of defect is going to cause severe error rate degradation. Therefore, the channel is usually not at the optimum operating point in terms of the best channel bit error rate.

Viterbi margin sample count at a certain level provides an indication of how many channel samples are separated from the decision boundary with that level. For example, a Viterbi margin count of 120 at level 9 means that there are 120 channel samples which are 9 least significant bits (LSBs) from the decision boundary. Another way that his can be expressed is if 9 LSB noise is added to any of these 120 samples, a channel bit error will occur. Under a real operating environment, some servo off-track occurs, which may produce multiple localized interference to the read operation. Accordingly, Viterbi margin counts directly reflects the potential bad channel samples.

It can also be seen that there is a need for a method and apparatus that adjusts FIR taps based upon Viterbi margin counts.

It can also be seen that there is a need for a method and apparatus that adjusts FIR taps to produce the best tap weights to produce the lowest bit error rate (BER) or lowest Viterbi margin count.

SUMMARY OF THE INVENTION

To overcome the limitations in the prior art described above, and to overcome other limitations that will become apparent upon reading and understanding the present specification, the present invention discloses a method and apparatus that adjusts FIR taps based upon Viterbi margin counts.

The present invention solves the above-described problems by adjusting FIR taps to minimize Viterbi margin counts. Since Viterbi margin counts directly affect the channel BER, the method and apparatus according to the present invention produces FIR taps with a BER lower than using the MSE method. Therefore, the present invention provides better channel performance in terms of wider bandwidth and less hard errors.

A method in accordance with the principles of the present invention a) selects one of N tap pairs for adjustment, b) adjusts the tap pair up one count and down one count, c) determines whether adjusting the tap pair up or adjusting the tap pair down provides a lower Viterbi margin count from the Viterbi detector and d) selects the tap adjustment for the pair that provides the lower Viterbi margin count.

Other embodiments of a method in accordance with the principles of the invention may include alternative or optional additional aspects. One such aspect of the present invention is that the method further includes e) repeating b–d for the remaining tap pairs.

Another aspect of the present invention is that the method further includes f) repeating a–e N times to obtain an optimal Viterbi margin count.

Another aspect of the present invention is that the adjustment meets a predetermined constraint criteria.

Another embodiment of the present invention includes a read channel that includes a finite impulse response filter having a plurality of adjustable taps for shaping an input signal to obtain a desired output waveform, a Viterbi detector, coupled to the finite impulse response filter for determining a most-likely input sequence represented by a margin count and a processor, coupled to the Viterbi detector, for monitoring the margin count and adjusting the taps of the finite impulse response filter, wherein the processor a) selects one of N tap pairs for adjustment, b) adjusts the tap pair up one count and down one count, c) determines whether adjusting the tap pair up or adjusting the tap pair down provides a lower Viterbi margin count from the Viterbi detector and d) selects the tap adjustment for the pair that provides the lower Viterbi margin count.

Yet another embodiment of the present invention includes a data storage system that includes at least one disk for storing data in data thereon, a motor for rotating the at least one disk, an actuator arm assembly including a head for reading and writing data on each of the at least one disk and a data channel, operatively coupled to the head, for processing read and write signals to read and write data on the disk, the data channel further including a write channel and a read channel, wherein the read channel further includes a finite impulse response filter having a plurality of adjustable taps for shaping an input signal to obtain a desired output waveform, a Viterbi detector, coupled to the finite impulse response filter for determining a most-likely input sequence represented by a margin count and a processor, coupled to the Viterbi detector, for monitoring the margin count and adjusting the taps of the finite impulse response filter, wherein the processor a) selects one of N tap pairs for adjustment, b) adjusts the tap pair up one count and down one count, c) determines whether adjusting the tap pair up or adjusting the tap pair down provides a lower Viterbi margin count from the Viterbi detector and d) selects the tap adjustment for the pair that provides the lower Viterbi margin count.

Another embodiment of the present invention includes an article of manufacture comprising a program storage medium readable by a computer, the medium tangibly embodying one or more programs of instructions executable by the computer to perform a method for adjusting taps in a FIR filter coupled to a Viterbi detector, the method comprising a) selects one of N tap pairs for adjustment, b) adjusts the tap pair up one count and down one count, c) determines whether adjusting the tap pair up or adjusting the tap pair down provides a lower Viterbi margin count from the Viterbi detector and d) selects the tap adjustment for the pair that provides the lower Viterbi margin count.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding-parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus that adjusts FIR taps by minimizing Viterbi margin counts. Since Viterbi margin counts directly affect the channel BER, the method and apparatus according to the present invention produces FIR taps with a BER lower than using the MSE method. Therefore, the present invention provides better channel performance in terms of wider bandwidth and less hard errors.

Figure 1:
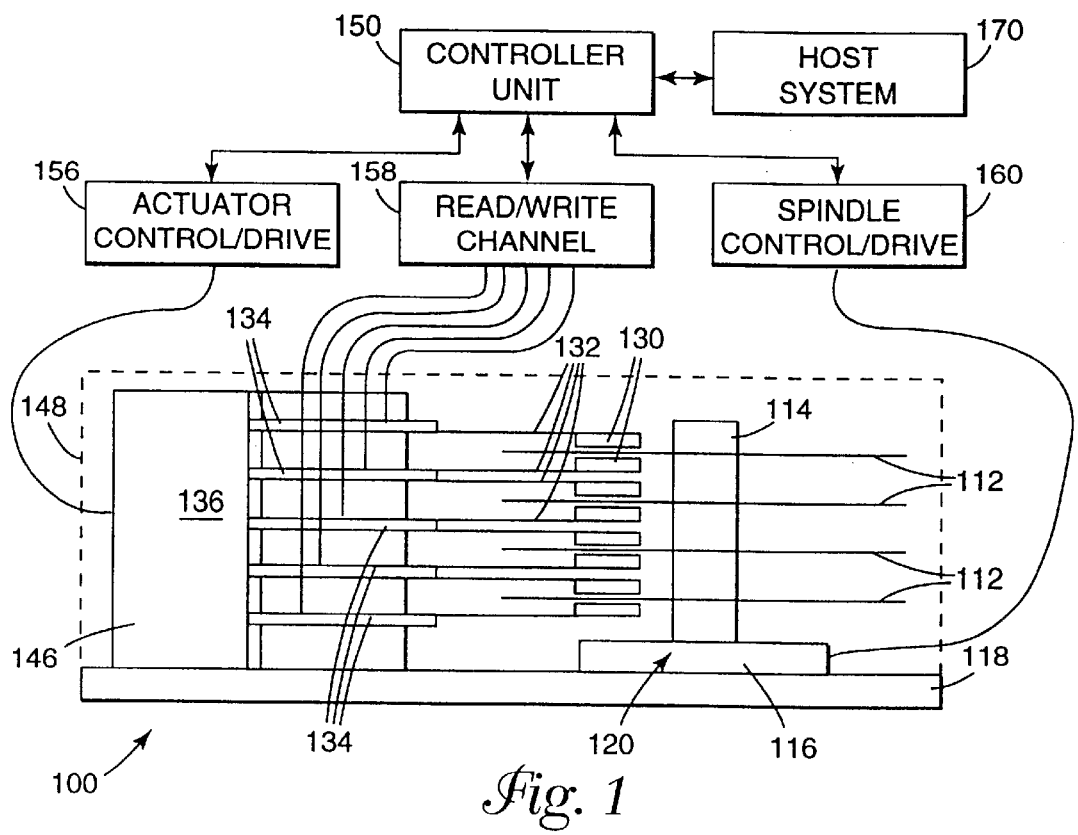
FIG. 1 is a schematic diagram of a data storage system suitable for practicing the present invention.

FIG. 1 is a schematic diagram of a data storage system 100 suitable for practicing the present invention. System 100 includes a plurality of magnetic recording disks 112. Each disk has a plurality of concentric data tracks. Disks 112 are mounted on a spindle motor shaft 114 which is connected to a spindle motor 116. Motor 116 is mounted to a chassis 118. The disks 112, spindle 114, and motor 116 include a disk stack assembly 120.

A plurality of sliders 30 having read/write heads are positioned over the disks 112 such that each surface of the disks 112 has a corresponding slider 130. Each slider 130 is attached to one of the plurality of suspensions 132 which in turn are attached to a plurality of actuator arms 134. Arms 134 are connected to a rotary actuator 136. Alternatively, the arms 134 may be an integral part of a rotary actuator comb. Actuator 136 moves the heads in a radial direction across disks 112. Actuator 136 is also mounted to chassis 118. Although a rotary actuator is shown in the preferred embodiment, a linear actuator could also be used. The sliders 130, suspensions 132, arms 134, and actuator 136 include an actuator assembly 146. The disk stack assembly 120 and the actuator assembly 146 are sealed in an enclosure 148 (shown by dashed line) which provides protection from particulate contamination.

A controller unit 150 provides overall control to system 100. Controller unit 150 typically contains a central a processing unit (CPU), memory unit and other digital circuitry. Controller 150 is connected to an actuator control/drive unit 156 which in turn is connected to actuator 136. This allows controller 150 to control the movement of sliders 130 over disks 112. The controller 150 is also connected to a read/write channel 158 which in turn is connected to the heads of the sliders 130. This allows controller 150 to send and receive data from the disks 112. Controller 150 is connected to a spindle control/drive unit 160 which in turn is connected to spindle motor 116 to allow the controller 150 to control the rotation of disks 112. A host system 170, which is typically a computer system, is connected to the controller unit 150. System 170 may send digital data to controller 150 to be stored on disks 112, or may request that digital data be read from disks 112 and sent to the system 170. The basic operation of DASD units is well known in the art and is described in more detail in Magnetic Recording Handbook, C. Dennis Mee and Eric D. Daniel, McGraw Hill Book Company, 1990.

The present invention is generally implemented in one or more computer programs that are executed by the control unit 150 or by processors (see FIG. 3) in the read/write channel 158 to perform the desired functions as described herein. Generally, the computer programs are tangibly embodied in and/or readable from a device, carrier, or media, such as a memories, data storage devices, and/or remote devices coupled to the computer via data communications devices. Thus, the present invention may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier, or media that provides access to instructions and/or data useful in performing the same or similar functionality. Of course, those skilled in the art will recognize many modifications may be made to this configuration without departing from the scope of the present invention.

Actuator 136 typically includes a rotating member 138 mounted to a rotating bearing 40, a motor winding 42 and motor magnets 44.

Figure 2:
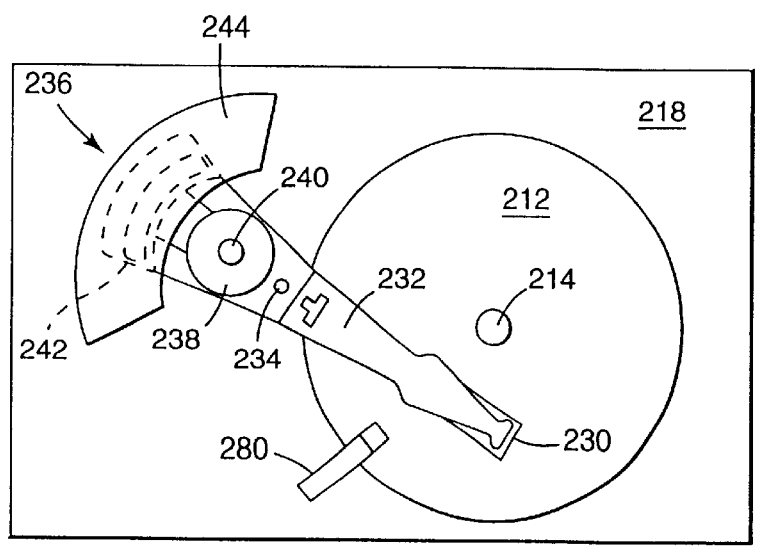
FIG. 2 shows a top view of the system illustrated in FIG. 1.

FIG. 2 shows a top view 200 of the system 100 illustrated in FIG. 1. Actuator 236 typically includes a rotating member 238 mounted to a rotating bearing 240, a motor winding 242 and motor magnets 244. A loading ramp member 280 is located at the edge of the disk stack assembly 220. Member 280 automatically unloads the sliders 230 from the disks 212 as actuator 236 moves the sliders 230 to the outer disk position. To unload a slider or head means to move it a vertical distance away from its corresponding disk surface. However, those skilled in the art will readily recognize that the ramp 280 is optional. Alternatively, the sliders 230 may be placed permanently in the loaded position between the disks.

Those skilled in the art will recognize that the present invention is not meant to be limited to the particular data storage system illustrated in FIGS. 1 and 2, but rather the data storage system is provided as an illustration of one example.

Figure 3:
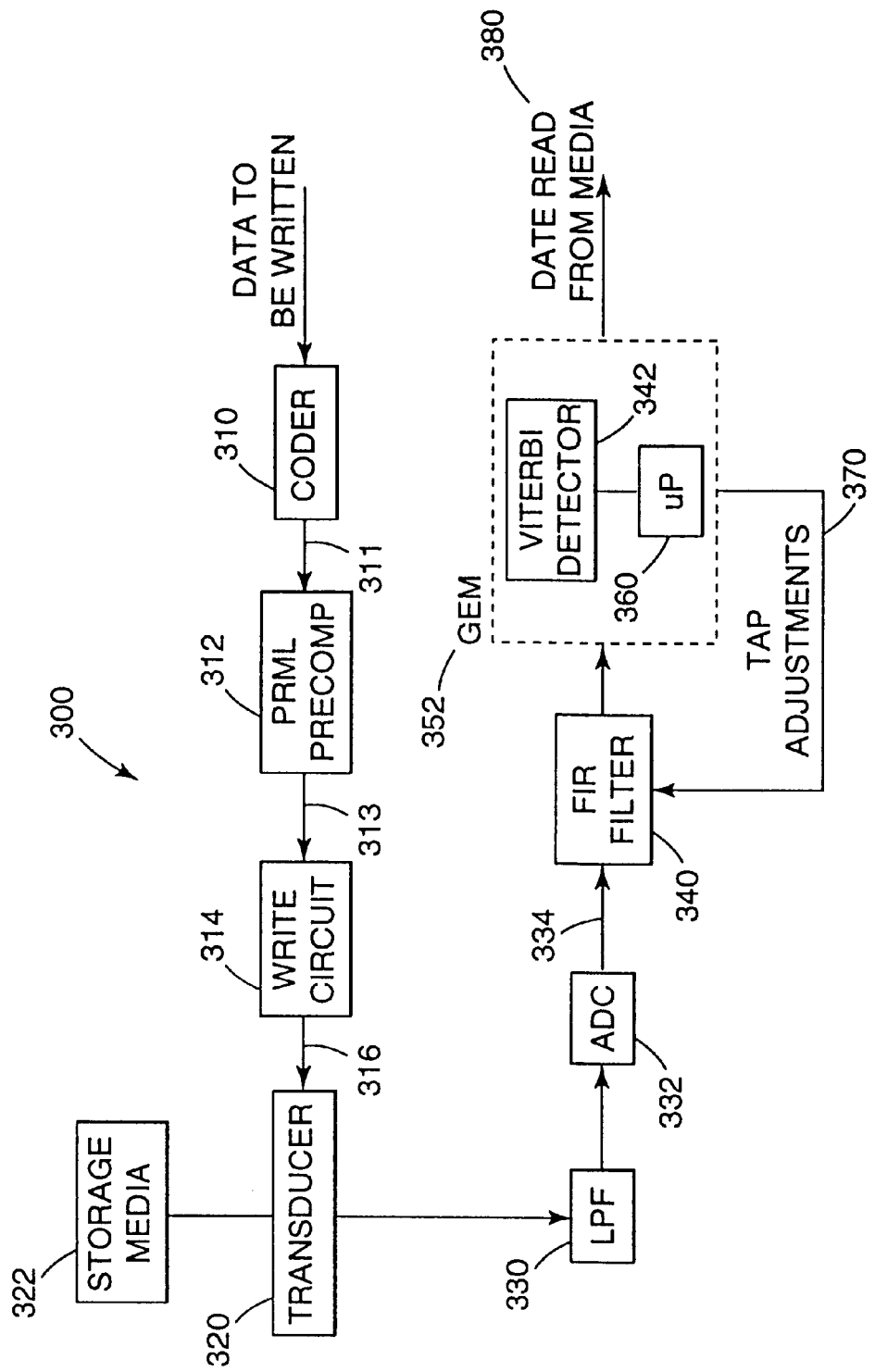
FIG. 3 illustrates a block diagram of a data channel as may be implemented in the control until or read/write channel of FIG. 1.

FIG. 3 illustrates a block diagram of a data channel 300 as may be implemented in the control until 150 or read/write channel 158 of FIG. 1. The data channel 300 includes an encoder 310 for providing a modulation coded output 311. Those skilled in the art will recognize that the encoder 310 may also include preceding. The encoder 310 is coupled to precompensation encoding 312 for providing a modulated binary pulse signal 313 that is applied to the write circuit 314. The write circuit 314 provides the modulated write current 316 to the transducer/head 320 for writing data to the storage media 322.

The head 320 also reads data from the storage media 322. The read signals 324 are passed through a low pass filter 330 and are then converted to digital signals 334 by the analog-to-digital converter (ADC) 332. The-ADC 332 provides the digitized read signals 334 to the FIR filter 340.

Figure 4:
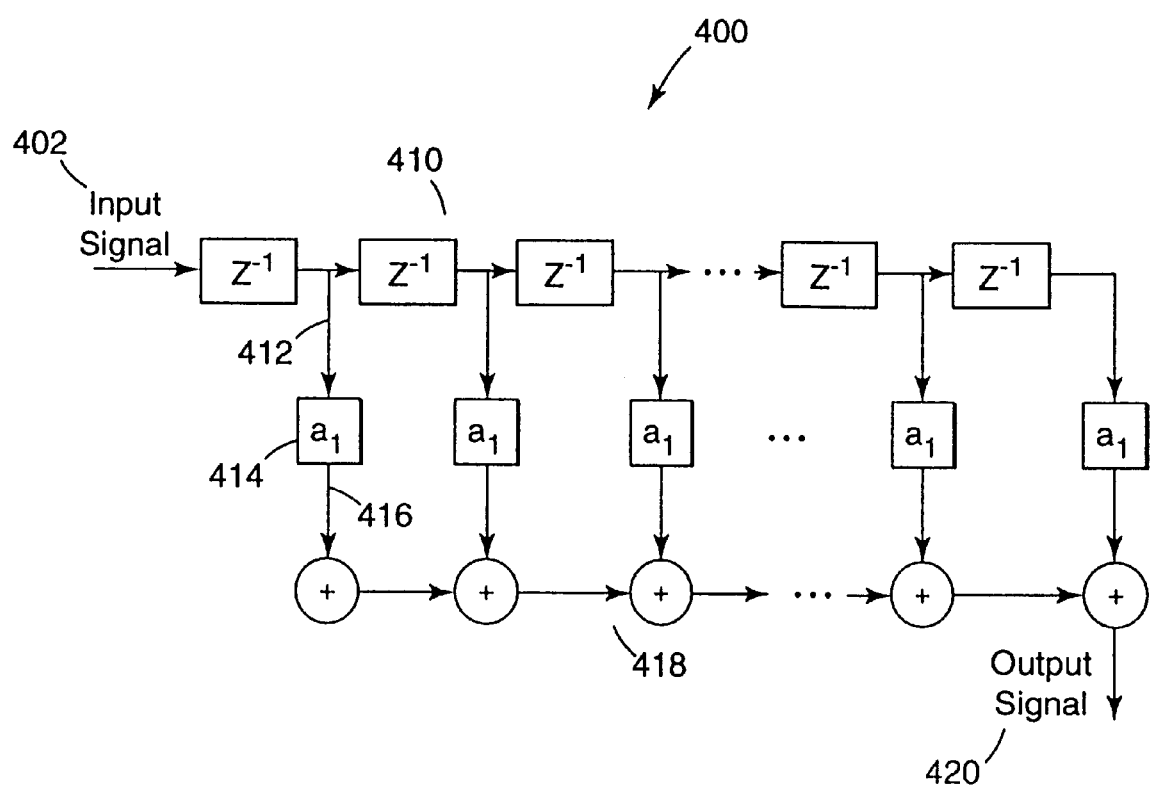
FIG. 4 illustrates one embodiment of a FIR filter.

The FIR filter 340 shapes the digitized read signals according to tap coefficients selected to provide the desired partial-response waveform. FIG. 4 illustrates one embodiment of a FIR filter 400. In FIG. 4, an input signal 402 is passed through a tapped delay line 410. Each of the taps 412 are weighted by a tap coefficient 414. The weighted signals 416 are then combined 418 to produce an output signal 420. Those skilled in the art will recognize the present invention is not meant to be limited to the FIR filter illustrated in FIG. 4, but that the FIR filter of FIG. 4 is provided as merely one example of a FIR filter. For example, a FIR filter may be implemented in hardware or in software. Further, the design of the FIR filter may be tailored to account for several design constraints and requirements such as filter length and desired pulse shape and other trade-offs.

Returning to FIG. 3, the Viterbi detector 342 determines the most likely channel-input sequence. General Error Measurement (GEM) circuitry 350 may be provided for monitoring the performance of the storage system. The GEM circuitry 350 includes a processor 360 programmed and configured to measure the Viterbi margin, which may then be used to adjust the taps 370 of the FIR 340 to obtain the read output signal 380.

In any channel design, the FIR taps are under certain constraints. For example, the FIR taps may be configured to satisfy the following equations:

Tap 0+Tap 2+Tap 4+Tap 6=constant

Tap 1+Tap 3+Tap 5+Tap 7=constant

Figure 5:
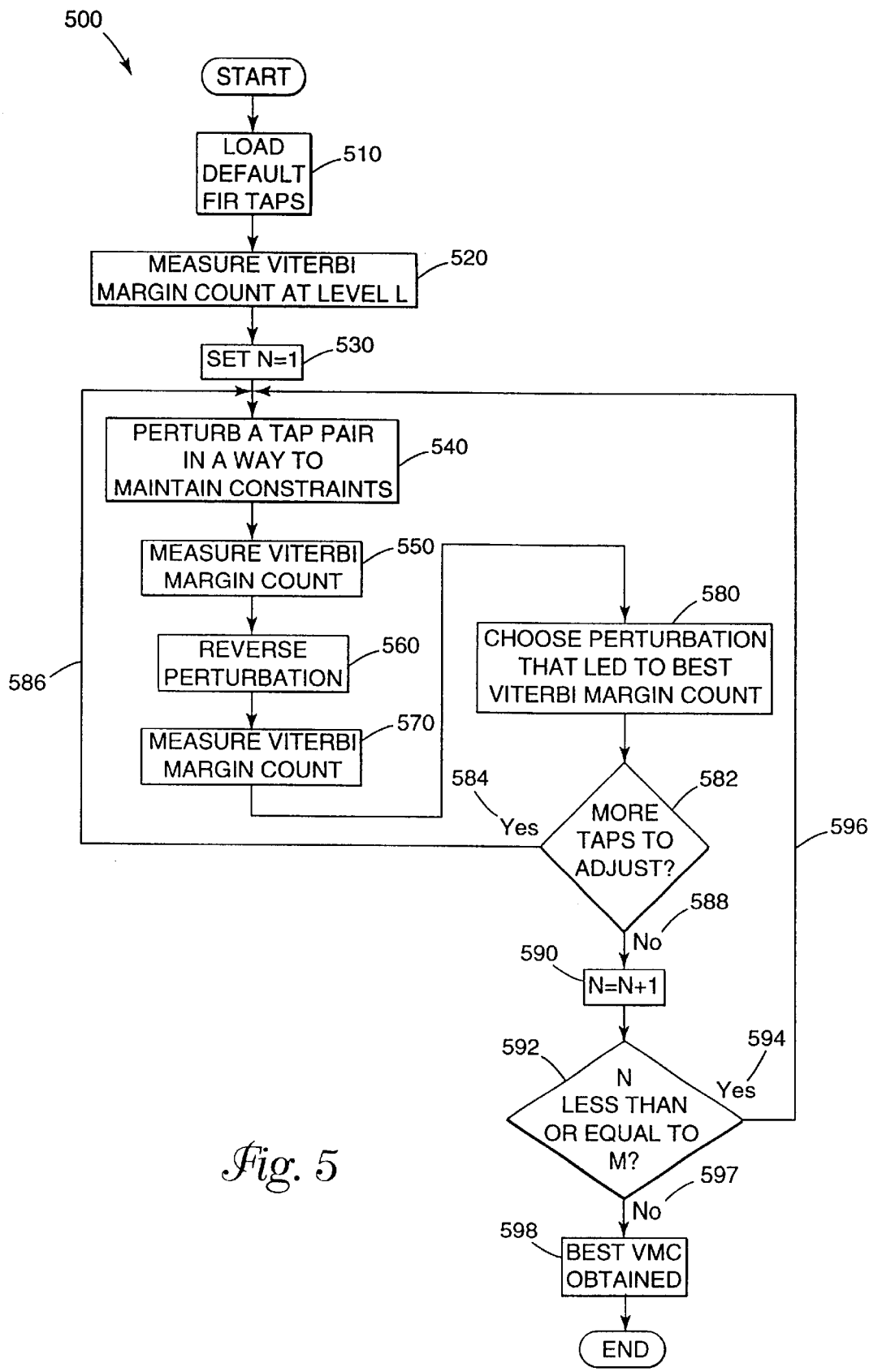
FIG. 5 is a flow chart illustrating the method of using Viterbi margin counts to equalize FIR taps according to the present invention.

FIG. 5 illustrates the method 500 of using Viterbi margin counts to equalize FIR taps according to the present invention. In FIG. 5, default FIR taps are loaded 510. Next, the Viterbi margin count is measured at level L 520 where L may be defined as 0<L<15. A counter is set so N=1 530. A tap pair is perturbed in a way that tap constraints are still valid 540. The Viterbi margin count is measured at level L 550. For example, tap O may be increased by one count and tap 2 may be decreased by one count. The opposite perturbation of the same taps is performed 560 and the Viterbi margin count is measured 570. The best Viterbi margin count is determined and its associated tap weights are used as the starting taps for the next step 580. A determination is made as to whether more tap pair are to be perturb 582. If more tap pairs are to be perturbed 584, repeat for different tap pairs 586. If not 588, the count is increased by 1 590. A determination is made as to whether N is less than or equal to M 592. If N is less than or equal to M 594, the pertubations for all taps is repeated 596. If not 597, the best Viterbi margin count has been obtained 598.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for adjusting taps in a FIR filter coupled to a Viterbi detector, comprising:

a) selecting one of N tap pairs for adjustment;

b) adjusting the tap pair up one count and down one count;

c) determining whether adjusting the tap pair up or adjusting the tap pair down provides a lower Viterbi margin count from the Viterbi detector; and d) selecting the tap adjustment for the pair that provides the lower Viterbi margin count.

2. The method of claim 1 further comprising e) repeating b–d for the remaining tap pairs.

3. The method of claim 2 further comprising f) repeating a–e N times to obtain an optimal Viterbi margin count.

4. The method of claim 1 wherein the adjustment meets a predetermined constraint criteria.

5. A read channel comprising:

a finite impulse response filter having a plurality of adjustable taps for shaping an input signal to obtain a desired output waveform;

a Viterbi detector, coupled to the finite impulse response filter for determining a most-likely input sequence represented by a margin count; and a processor, coupled to the Viterbi detector, for monitoring the margin count and adjusting the taps of the finite impulse response filter, wherein the processor a) selects one of N tap pairs for adjustment, b) adjusts the tap pair up one count and down one count, c) determines whether adjusting the tap pair up or adjusting the tap pair down provides a lower Viterbi margin count from the Viterbi detector and d) selects the tap adjustment for the pair that provides the lower Viterbi margin count.

6. The read channel of claim 5 further comprising e) repeating b–d for the remaining tap pairs.

7. The read channel of claim 6 further comprising f) repeating a–e N times to obtain an optimal Viterbi margin count.

8. The read channel of claim 5 wherein the adjustment meets a predetermined constraint criteria.

9. A data storage system comprising:
- at least one disk for storing data in data thereon;
- a motor for rotating the at least one disk;
- an actuator arm assembly including a head for reading and writing data on each of the at least one disk; and
- a data channel, operatively coupled to the head, for processing read and write signals to read and write data on the disk, the data channel further comprising a write channel and a read channel, wherein the read channel further comprises:
  - a finite impulse response filter having a plurality of adjustable taps for shaping an input signal to obtain a desired output waveform;
  - a Viterbi detector, coupled to the finite impulse response filter for determining a most-likely input sequence represented by a margin count; and
  - a processor, coupled to the Viterbi detector, for monitoring the margin count and adjusting the taps of the finite impulse response filter, wherein the processor a) selects one of N tap pairs for adjustment, b) adjusts the tap pair up one count and down one count, c) determines whether adjusting the tap pair up or adjusting the tap pair down provides a lower Viterbi margin count from the Viterbi detector and d) selects the tap adjustment for the pair that provides the lower Viterbi margin count.

10. The data storage system of claim 9 wherein the processor e) repeats b–d for the remaining tap pairs.

11. The data storage system of claim 10 wherein the processor f) repeating a–e N times to obtain an optimal Viterbi margin count.

12. The data storage system of claim 9 wherein the adjustment meets a predetermined constraint criteria.

13. An article of manufacture comprising a program storage medium readable by a computer, the medium tangibly embodying one or more programs of instructions executable by the computer to perform a method for adjusting taps in a FIR filter coupled to a Viterbi detector, the method comprising:
   a) selecting one of N tap pairs for adjustment;
   b) adjusting the tap pair up one count and down one count;
   c) determining whether adjusting the tap pair up or adjusting the tap pair down provides a lower Viterbi margin count from the Viterbi detector; and
   d) selecting the tap adjustment for the pair that provides the lower Viterbi margin count.

14. The method of claim 13 further comprising e) repeating b–d for the remaining tap pairs.

15. The method of claim 14 further comprising f) repeating a–e N times to obtain an optimal Viterbi margin count.

16. The method of claim 13 wherein the adjustment meets a predetermined constraint criteria.

* * * * *

UNITED STATES PATENT AND TRADEMARK OFFICE
CERTIFICATE OF CORRECTION

PATENT NO.   : 6,600,617 B1  Page 1 of 1
DATED        : July 29, 2003
INVENTOR(S)  : Zeng It is certified that error appears in the above-identified patent and that said Letters Patent is hereby corrected as shown below:

Column 1,
Line 17, "(hpi)" should read -- (bpi) --.
Line 34, insert -- (ISI) -- after the word "interference".
Line 35, the first "the" should read.
Line 60, "the" should read -- a --.

Column 3,
Line 1, "a.finite" should read -- a finite --.

Column 4,
Line 47, "The.basic" should read -- The basic --.

Column 5,
Line 42, "The-ADC" should read -- The ADC --.
Lines 62 and 64, "350" should read -- 352 --.

Signed and Sealed this

Sixteenth Day of December, 2003

JAMES E. ROGAN
*Director of the United States Patent and Trademark Office*